B. T. ANDREN

ATTACHING TAPPED NUTS TO METAL PLATES

Dec. 16, 1930.

Re. 17,907

Original Filed July 15, 1927

WITNESS:
Floyd Palm
Du.

INVENTOR.
BIRGER T. ANDREN

BY
Ernim, Wheeler & Woodard
ATTORNEYS.

Reissued Dec. 16, 1930

Re. 17,907

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

ATTACHING TAPPED NUTS TO METAL PLATES

Original No. 1,705,463, dated March 12, 1929, Serial No. 205,963, filed July 15, 1927. Application for reissue filed April 2, 1930. Serial No. 441,156.

The invention relates to an improvement in the means for and method of securing tapped nuts in perforations formed in thin metal plates, so that such nuts will be in proper position and be held against rotation at the time that bolts or screws are entered into the threaded holes thereof.

The object of the invention is the provision of means for attaching specially shaped nuts to metal plates or other parts in a simple manner, so as to place the stresses of the screws engaging the nuts directly upon the plate and so relieve the joints from strain, and this result is accomplished by producing upon one side of the plate an embossment which co-operates with the nut and serves to interpose resistance to the stresses by placing the metal of the embossment under compression.

Having thus indicated the nature and purposes of my invention, I will now describe in detail the actual practice of the same, and will point out in the appended claims the novel features residing in the invention.

The present application forms a continuation in part of my co-pending application, Serial No. 149,100, filed November 18, 1926, for all the common subject matter disclosed therein.

In many classes of work in making the desired connections, the nuts are placed loosely in or over the perforations in the plate and there held by hand while the bolt or screw is being inserted. This practice involves a very tedious and time consuming operation, under certain conditions, and to relieve the situation, various adjunctive devices for holding the nuts in position while entering the bolts or screws where the work is close have been resorted to. But such devices are costly, and require a wasteful expenditure of time in their application.

In the practice of the present invention, perforations of non-circular contour, preferably polygonal are formed in the plates at the desired places by a simple punching operation. At the time of punching the hole in the metal plate, the metal of the plate surrounding the perforation is displaced laterally so as to form a slight embossment at one side, and a slight concavity at the other, which construction serves to place the metal of the plate in the region of the perforation under compression when a force tending to reduce the embossment is exerted. Fitted in the perforation, is the correspondingly formed reduced shank of a specially constructed pierced nut, which prior to its insertion in the perforation in the plate is properly tapped. By reason of the special construction of the shank formed upon one side of the nut, the shank may be expanded laterally so as to fill the perforation in the plate and engage the wall thereof and rigidly secure the nut in position. This very desirable result is achieved without disturbing the thread of the nut, the intervening metal preventing the flow toward the thread, and without disturbing the angular position of the embossment upon the plate. In upsetting the shank of the nut, the rim or edge at the free end of the shank projecting through the embossment on the plate and into the concavity at the opposite side, is pressed in the expanding operation so as to lie substantially flush with the surface of the plate within the concavity, and slightly within the side planes of the plate. The opening in the nut flares outwardly to the end of the shank, so that the tapering opening thus produced acts to center the threaded end of the screw and direct it into engagement with the nut. As so arranged, the nuts are always in the desired positions, and the work of connecting the parts is greatly facilitated.

Figure 1:
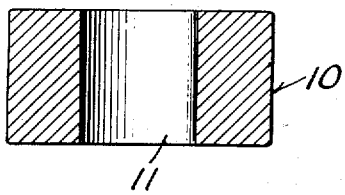
Fig. 1 is an axial, central sectional view through a nut blank.
Figure 2:
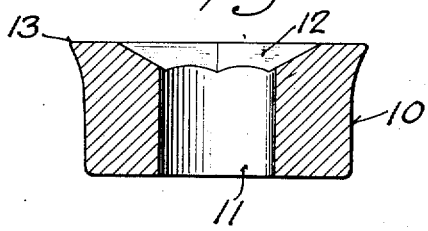
Fig. 2 is a like view after the blank has been subjected to the first upsetting operation.

In referring now to the drawing, the numeral 10 indicates a nut blank, which may be produced by punching from a metal plate of the desired gauge, or by cutting from bar stock. The nut blank may be cylindrical or polygonal, it matters not which, and will be axially perforated at 11, in the customary manner. See Fig. 1. The nut blank 10 is then subjected to the action of upsetting dies, which will form the depression or recess 12. The latter flares outwardly from the perforation 11 at one side of the nut blank. At the time the displacement of the metal occurs in the formation of the depression 12, the adjacent metal is moved radially to form the transverse enlargement 13 on the end of the nut blank. See Fig. 2.

Figure 3:
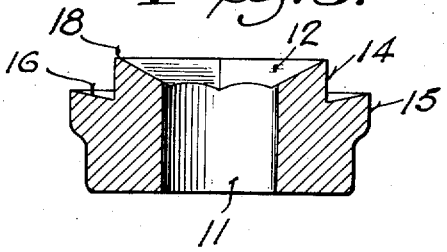
Fig. 3 is a like view after the blank has been subjected to the final shaping operation.
Figure 4:
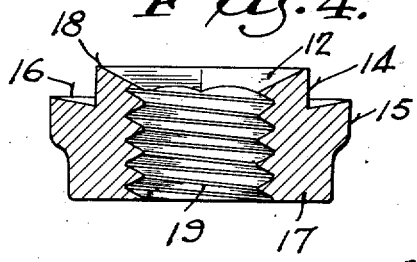
Fig. 4 is a like view showing the nut as completed by the tapping operation.
Figure 5:
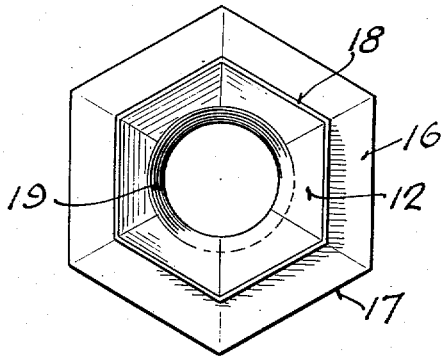
Fig. 5 is a plan view of the nut as shown in Fig. 4.

The blank is then subjected to the action of another set of dies, which compress the metal to form the hexagonal shank 14, or of a form other than cylindrical, but of reduced diameter and the circumferential rib 15 about the median line of the nut, with a circular shoulder 16, at the base of the shank, such shoulder connecting the shank 14 and the rib 15. See Fig. 3. The face of the shoulder 16 which extends transversely of the axis of the nut may be slightly dished, as shown, so as to receive the embossment and effect a close contact between the outer marginal edge or rim 16 of the shoulder and the face of the embossment on the metal plate to which the nut is to be attached. The nut 17 is then completed by tapping the perforation 11 therein, so as to provide the same with a thread, as at 19. The depression 12 in the end of the shank of the nut tapers inwardly from the marginal edge or rim 18 directly to the threaded opening 19, this constituting a centering means for the leading end of the attaching screw, conducing to a quicker engagement of the screw with the nut.

Figure 6:
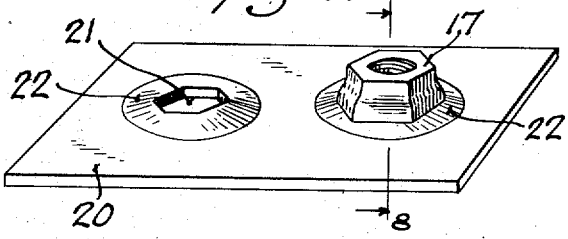
Fig. 6 is a perspective view of a plate showing the outline of one of the perforations in which the shank of a hexagonal nut is received, together with the embossment thereon, and also a hexagonal nut as secured to the plate.
Figure 7:
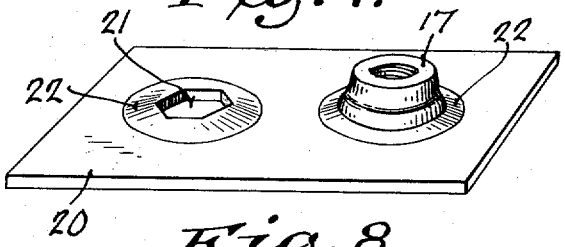
Fig. 7 is a like view, but showing a cylindrical nut.

In Figs. 6 and 7, the numeral 20 indicates a metal plate, suitably perforated as at 21 for the reception of the shank 14 of the nut. The outline of the perforation 21 in the plate 20 should conform substantially to the exterior configuration of the shank 14 of the nut, so that when assembled the non-circular formations of these parts will engage each other, and there can be no rotation of the nut while the threaded end of a screw is entered therein.

Figure 8:
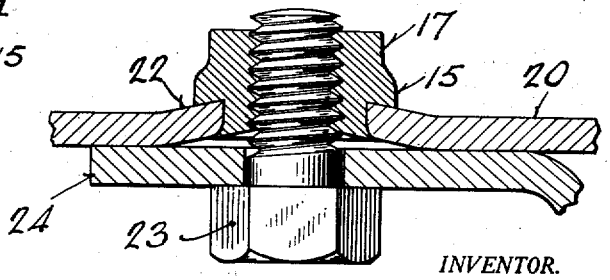
Fig. 8 is an enlarged sectional view through the plate and nut, on the line 8—8, Fig. 6, showing the embossment and concavity formed in the plate, and the manner of anchoring the nut in the perforation of the plate, without disturbing the thread of the nut, together with a cap screw attaching a part to the plate.

Viewing Figs. 6, 7 and 8, it will be seen that the metal of the plate 20 surrounding the perforation 21 therein, is displaced laterally from the plane of the plate. This condition is produced in the punching operation, and the slight embossment 22 upon one side of the plate is adapted to be received in the dish of the shoulder 16 on the nut, when the shank 14 is passed through the perforation 21. In the upsetting operation on the upstanding edge or rim 18 of the shank of the nut, an outward flow of the metal thereof takes place. This is due to the fact that when the upsetting pressure is exerted, the thicker part of the inclined wall of the flaring recess in the shank resists the inward flow of the metal of the shank, and such flow follows an unopposed outward course, to spread the metal into close engagement with the walls of the perforation 21 in the plate, with a wedging action. At the same time, the dished shoulder 16 of the nut is brought into close engagement with the face of the embossment 22 on one side of the plate 20, and a good contact is effected. The projecting edge or rim 18 is broken down and made to lie flush with the surface of and within the concavity formed on the other side of the plate by the displacement of the metal which produces the embossment. In the upsetting operation, the end of the shank 14 of the nut is made to lie slightly within the side planes of the metal plate, and within the concaved side of the latter. The thread of the nut is not disturbed, inasmuch as the thread, extending only to the bottom of the depression or recess 12, is removed from the region of pressure. The construction thus provided may be put to its intended uses without further threading of the nut. In these operations, the embossment on the plate 20 is placed under compression, and so creates a yielding resistance to the stress upon the screw. This prevents the joint at the nut from bending, and the nut from becoming loose.

Fig. 8 shows the use and operation of the invention, it illustrating how a screw 23, entered into the nut 15, serves to secure an attachment 24 to the plate 20, and maintain a tight connection between the plates, the pull upon the nut being against the displaced portion of the plate, the concavity providing a clearance permitting movement under compression. Deforming the plate 20 in the manner described, causes it to act as does a nutlock or spring washer.

The simple operations incident to the production of the invention contribute to the economical use of the latter. While a specific use of the invention has hereinbefore been set forth, the invention is not to be so limited in its use, but obviously may be put to other uses than that stated.

Having thus described my invention, what I claim and desire to secure by Letters Patent of the United States is:

1. The method of securing tapped nuts to metal plates, which comprises the operations of providing a perforation in the plate and displacing the surrounding metal to form an embossment upon one side of the plate and a concavity upon the other, forming a nut with a shank at one side and a dished shoulder at the base of the shank to receive the said embossment, inserting the shank of the nut through the perforation in the plate with the dish of the shoulder engaging the said embossment, and expanding the metal of the shank into engagement with the wall of the perforation, to secure the nut in position, without filling the concavity.

2. The method of securing tapped nuts to metal plates to produce a structure in which the nut is secured to the plate on an embossment thereof which surrounds the nut and provides an unfilled concavity in the opposite side of the plate co-extensive with said embossment, which comprises the operations of providing a perforation in the plate, forming a nut having an axial shank in such a manner as to provide a screw-centering flaring recess in the free end of the shank and a dished shoulder at the base of the shank, inserting the shank of the nut through the perforation in the plate, and applying pressure to the shank of the nut to engage the dished shoulder of the nut with one side of the plate and expand the metal of the shank surrounding the flaring recess into engagement with the wall of the perforation in the plate, whereby the nut is secured to the plate without disturbing the thread of the nut.

3. The method of securing tapped nuts to metal plates, which comprises the operations of providing a non-circular perforation in the plate and displacing the metal surrounding the perforation to produce an embossment upon one side of the plate and a concavity upon the opposite side, forming a nut with a shank at one side with a screw-centering flaring recess in the end of the shank and a dished shoulder at the base of the shank to receive the said embossment, inserting the shank of the nut through the perforation in the plate with the said embossment in the dish of the shoulder, and applying pressure to the end of the shank in the concavity to engage the dished shoulder with one side of the plate and expand the metal of the shank into engagement with the walls of the perforation without filling the concavity, to secure the nut in position, without disturbing the thread thereof.

4. The method of securing tapped nuts to metal plates, which comprises the operations of providing a perforation in the plate and displacing the metal surrounding the perforation to produce an embossment upon one side of the plate and a concavity upon the other, forming a threaded nut with a shank at one side with an inwardly tapering recess in the end of the shank leading directly to the threaded portion and a dished shoulder at the base of the shank, inserting the shank of the nut through the perforation in the plate with the said embossment in the dish of the shoulder, and applying pressure to the end of the shank to engage the dished shoulder with one side of the plate and expand the metal of the shank into engagement with the metal about the perforation, to secure the nut in position, without filling the concavity.

5. Connected metal parts comprising a perforated metal plate having the metal about the perforation displaced to form an embossment upon one side of the plate and a concavity upon the other, combined with a nut provided at one end with a shank having a flaring recess in its free end and a dished shoulder at the base thereof, the said shank being received in the perforation with the embossment seated in the dish of the shoulder, and with expanded metal of the recessed free end of the shank closely engaging the wall of the perforation to secure the nut to the plate without filling the concavity.

6. Connected metal parts comprising a perforated metal plate having the metal about the perforation displaced to form an embossment upon one side of the plate and a concavity upon the other, combined with a nut provided at one end with a shank and a dished shoulder at the base thereof, the said shank being received in the perforation with the embossment seated in the dish of the shoulder, and with expanded metal of the free end of the shank closely engaging the wall of the perforation to secure the nut to the plate without filling the concavity.

7. The method of securing nuts to metal plates to produce a structure in which the nut is secured to a plate on an embossment thereof which surrounds the nut and provides an unfilled concavity in the opposite side of the plate co-extensive with said embossment, which comprises the operations of providing a perforation in the plate and displacing the adjacent metal to form an embossment upon one end of the plate, forming a nut with a shank at one side and a dished shoulder at the base of the shank to receive the said embossment, inserting the shank of the nut through the perforation in the plate with the dish of the shoulder engaging the said embossment, and expanding the metal of the shank into engagement with the metal about the perforation without disturbing the angular position of the embossment.

8. The method of securing nuts to metal plates which comprises the operations of providing a perforation in the plate and displacing the adjacent metal to form an embossment upon one side of the plate and a concavity upon the other, forming a nut with a shank at one end and a dished shoulder at the base of the shank to receive the said embossment, inserting the shank of the nut through the perforation in the plate with the dish of the shoulder engaging the said embossment, and expanding the metal of the shank into engagement with the metal about the perforation without disturbing the angular position of the embossment and without filling the concavity.

9. The method of attaching metal parts by threaded connecting members and providing in the parts to be connected yielding locking means for the threaded members which comprises the operations of perforating one of the parts to be connected and displacing the metal about the perforation to form an embossment upon one side of the plate and a recess upon the other, applying a threaded nut to the embossment, then applying a perforated part to the recessed side of the first mentioned part with the perforations aligned, and passing a threaded member through the aligned perforations in the said part and the plate and into engagement with the threaded nut, whereby, when the threaded member is tightened, the parts are yieldingly connected together.

10. Connected metal parts, one of the parts to be connected being perforated and having the metal about the perforation displaced to form an embossment upon one side of the part and a recess upon the other, a second perforated part arranged at the recessed side of the first-mentioned part with the perforations aligned, combined with a threaded nut arranged on the embossment, and a screw-threaded member passed through the perforations in the said parts and engaging the nut to yieldingly connect the two parts together.

11. A method of connecting metal parts which comprises providing one of said parts to be connected with a perforation of non-circular contour, displacing the metal adjacent said perforation to form an embossment upon one side of the part and a concavity upon the other, forming a nut having a shank of a contour complementary to that of said perforation, inserting said shank of the nut into said perforation, providing another of said metal parts with a perforation to align with the perforation in said first named part, placing said metal parts adjacent each other with the perforations thereof in alignment and passing a threaded member through the aligned perforations into threaded engagement with said nut to connect said parts and compress said embossment to maintain the tightness of said connection.

12. Connected metal parts which by structural modification of one of the parts to be connected provide resilient locking means for threaded connecting members comprising a metal plate having a perforation of non-circular contour with the metal about the perforation displaced to form an embossment upon one side of the plate and a recess upon the other, a second perforated element arranged at the recess side of the plate with the perforation thereof aligned with said first mentioned perforation, and means joining said plate and element and comprising a threaded nut having a shank portion of a contour complementary to that of said first mentioned perforation and extending therethrough with the base of said shank portion engaging said embossment, and a screw passed through the perforations in said element and plate and engaging the nut to yieldingly connect the plate to the element and prevent loosening of said nut.

13. The method of connecting a plate to a part by threaded connecting members and providing in the parts to be connected yielding locking means for the threaded members which comprises the operations of perforating the plate and displacing the material about the perforation to form an embossment upon one side of the plate and a recess upon the other, applying a perforated part to the recessed side of the plate with the perforations aligned, and passing a threaded member through the aligned perforations in said part and the plate and into engagement with a threaded nut whereby a resistance to the loosening stresses of the threaded members is effected when the plate and part are firmly secured together.

14. The method of preparing a metal plate for attachment to a metal part by threaded connecting members and providing in the plate yielding locking means for the threaded members which comprises perforating the plate to receive a threaded member and displacing the metal adjacent the perforation to form a recess on the side of the plate juxtaposed to the part to be connected thereto whereby a resistance to the loosening stresses of the plate and part is effected when the same are secured together by the threaded member.

15. Connected parts which by structural modification of one of the parts to be connected provide resilient locking means for the threaded connecting members comprising a perforated plate having an embossment formed adjacent the perforation upon one side of the plate and a recess upon the other, a second perforated element arranged at the recessed side of the plate with the perforations aligned, combined with a threaded member passing through the perforations in said element and the plate and engaging a threaded nut to connect the plate to the element.

16. The method of attaching metal plates by threaded connecting members and providing in the plates to be connected yielding locking means for the threaded members which comprises the operations of perforating a plate, forming a recess adjacent said perforation at one side of the plate, providing a second perforated plate, applying a threaded nut to the perforation in one of said plates with a projection on said nut extending through the perforation of said plate, deforming said projection on said threaded nut to interlock said nut with the said plate, arranging said plates with the perforations thereof aligned, the recess in one of said plates receiving the deformed projection of said nut without the said projection filling the recess, and passing a threaded member through the perforations in said plates and into engagement with the threads of said nut whereby, when the threaded member is tightened with the said nut, the plates are yieldably connected.

17. Connected metal parts which by structural modification of one of the parts to be connected provide resilient locking means for the threaded connecting members comprising a perforated metal plate having a recess in one side thereof adjacent the perforation therein, a second perforated plate arranged at the recessed side of the first-named plate with the perforations thereof aligned, combined with a threaded nut having a projection extending through the perforation in one of said plates and being formed to interlock with said plate, and a threaded member passing through the perforations in said plates and having engagement with said threaded nut to yieldably connect the plates together.

18. The method of securing tapped nuts to metal plates, which comprises the operations of providing a perforation in the plate and displacing the surrounding metal to form an embossment upon one side of the plate and a cavity upon the other, forming a nut with a projection at one side and a recessed shoulder at the base of the projection to receive the said embossment, inserting the projection of the nut through the perforation in the plate with the recessed shoulder engaging the said embossment, and deforming the metal of the projection into engagement with the plate to secure the nut in position, without filling the cavity.

19. The method of securing tapped nuts to metal plates to produce a structure in which the nut is secured to the plate on an embossment which surrounds the nut and provides an unfilled concavity on the opposite side of the plate co-extensive with said embossment, which comprises the operations of providing a perforation in the plate, forming a nut with an axial non-circular tubular projection, providing a screw-centering flaring recess in the free end thereof and a recessed shoulder at the base of the projection, inserting the projection of the nut through the perforation in the plate, and applying pressure to the projection of the nut to deform the metal of the projection into engagement with the plate and cause the recessed shoulder of the nut to engage with one side of the plate, whereby the nut is secured to the plate without disturbing the thread of the nut.

20. Connected metal parts comprising a perforated metal plate having the metal about the perforation displaced to form an embossment upon one side of the plate and a cavity upon the other, combined with a nut provided with an axial projection having a recess in its free end and a shoulder at the base thereof, the said projection being received in the perforation with the embossment seated against the shoulder, and with expanded metal of the recessed free end of the projection engaging the plate to secure the nut to the plate without filling the cavity.

In witness whereof I have hereunto subscribed my name at Milwaukee, Wisconsin, this 29th day of March, 1930.

BIRGER TORVALD ANDREN.

CERTIFICATE OF CORRECTION.

Reissue Patent No. 17,907. Granted December 16, 1930, to

BIRGER TORVALD ANDREN.

It is hereby certified that error appears in the printed specification of the above numbered patent requiring correction as follows: Page 3, line 117, claim 7, for the word "end" read side, and line 118, for the word "side" read end; and that the said Letters Patent should be read with these corrections therein that the same may conform to the record of the case in the Patent Office.

Signed and sealed this 20th day of January, A. D. 1931.

M. J. Moore,
Acting Commissioner of Patents.

(Seal)